Feb. 6, 1968     H. KORRENN ET AL     3,367,729
ANTIFRICTION BEARINGS PROVIDED WITH BUILT-IN FEELER-MEANS

Original Filed Nov. 8, 1963

INVENTORS
HEINZ KORRENN
WILLI KIRCHNER

United States Patent Office 3,367,729
Patented Feb. 6, 1968

3,367,729
ANTIFRICTION BEARINGS PROVIDED
WITH BUILT-IN FEELER-MEANS
Heinz Korrenn, Schweinfurt, and Willi Kirchner, Schwebheim, Germany, assignors to Kugelfischer Georg Schafer & Co., Schweinfurt, Germany
Original application Nov. 8, 1963, Ser. No. 322,288, now Patent No. 3,252,745, dated May 24, 1966. Divided and this application Nov. 17, 1965, Ser. No. 521,473
10 Claims. (Cl. 308—173)

ABSTRACT OF THE DISCLOSURE

A feeler device in an antifriction bearing having an inner race member, an outer race member, at least one roller member and a roller cage, the device having at least one feeler means having one end fixed to one of the race members and the other end extending towards the other race member. Means are also provided which are associated with the feeler means to measure the distance between the other end thereof and the other race member.

This application is a division of applicants' copending U.S. patent application Ser. No. 322,288, filed Nov. 8, 1963, now Patent No. 3,252,745, issued May 24, 1966.

This invention relates to antifriction bearings which are provided with built-in feeler means serving a purpose to be elucidated presently.

For the proper application of antifriction bearings, it is necessary to provide antifriction bearings which differ in regard to the clearances existing therein so as to make it possible to take into consideration the various classes of fits and the different operating conditions to be met in each individual case when selecting ball or roller bearings for a given application. The use of different clearance ranges has the purpose of ensuring a minimum operative play in each individual case. The provision of minimum play in an antifriction bearing will result in a satisfactory distribution of the load in the bearing and will ensure adequate concentricity of the parts supported by the bearing. In certain cases, for example, in the case of machine tool spindles, which are required to afford not only maximum precision and concentricity but also the highest possible amount of rigidity, the antifriction bearings are fitted in such a manner that during operation they are subject to a certain amount of preload. In such a case, the distance between the race surfaces of the bearing is smaller than the diameter of the rolling bodies in their unloaded condition. Particularly in the case of such a preloaded antifriction bearing even a small change in the preload will result in a considerable change in the forces transmitted at the contact areas between the races and the rolling bodies, because the antifriction bearing acts in the same manner as a spring of extremely high rate.

It has been known to use feeler gages to measure the clearance existing in an antifriction bearing, whether mounted in position or not, while the bearing is at rest. In the case of a bearing mounted in position, the associated shaft is then moved in a radial or axial direction, the amount of displacement of the shaft being measured with the aid of dial indicators or other known instruments. In the case of antifriction bearings, however, which are either in operation or which are preloaded, i.e. which have a so-called negative clearance or play, it is impossible to use the measuring instruments mentioned above, nor would it be possible to measure a bearing play in the order of magnitude of a few thousandths of a millimeter or a few ten-thousandths of an inch.

According to the invention, the aforementioned deficiencies are eliminated by the provision, within an antifriction bearing, of stationary feeler means adapted to operate mechanically, optically, electrically, electronically or pneumatically in a per se known manner and permitting the distance between the bearing races to be measured with high accuracy. It is of particular advantage to provide for the feeler means to be engaged only during the actual measuring operation, and to give the feeler means a length which is smaller than the diameter of one of the rolling bodies of the bearing. Preferably the feeler means will be accommodated in the stationary bearing race in such a manner as to co-operate with the race surface of the second race or with one of the rolling bodies. The feeler means are arranged, in a per se known manner, to provide control signals permitting either the play or the preload of the bearing to be ascertained.

Other objects and features of the invention will become apparent as the description proceeds, especially when taken in conjunction with the accompanying drawing, illustrating a preferred embodiment of the invention, wherein.

Figures 1, 2:
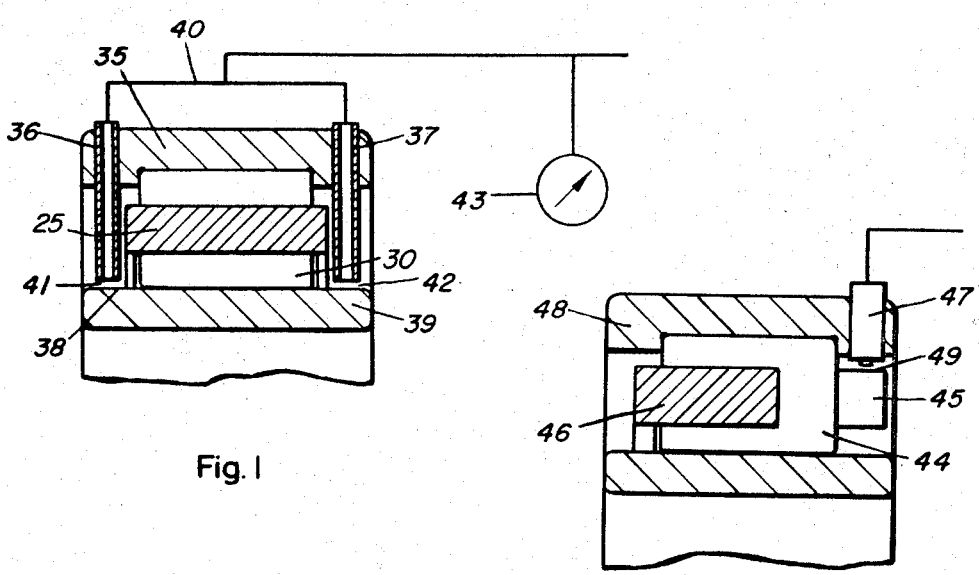
FIG. 1 is a fragmentary cross-sectional view of an embodiment of the invention adapted to measure bearing play and/or preload either during operation of the bearing or while the bearing is at rest.
FIG. 2 is a fragmentary cross-sectional view of an embodiment of the invention in which the feeler means co-operate with a projection provided on one of the rolling bodies.

FIG. 1 illustrates an embodiment of the invention permitting the play or preload of a bearing to be measured also during operation of the bearing. In FIG. 1 there is shown an outer race 35 and an inner race 39 between which is mounted a roller 30, it being understood that a plurality of rollers are provided which are maintained equidistantly spaced by means of roller cage 25. Mounted in the outer race 35 are two radially inwardly extending measuring nozzles 36 and 37 whose inner ends face either a preferably cylindrical surface 38 of the rotating inner race 39, which surface may, as shown in FIG. 1, be constituted by a portion of the inner race surface itself. The measuring nozzles 36 and 37 form component parts of a pneumatic measuring circuit 40 of known construction. Depending on the width of the gaps 41 and 42 between the inner ends of the nozzles 36, 37 and the cylindrical race surface 38, a certain pressure will build up in the measuring circuit, this pressure being indicated by a pressure gage 43. As shown in FIG. 1, the nozzles are connected in the circuit in such a manner that an average is derived of the width of the two gaps. Preferably, the measuring nozzles are adjusted in such a manner that a zero indication of pressure gage 43 corresponds to a race-to-race distance equaling the diameter of the rolling bodies or rollers.

In special cases it may be desirable to determine the preload of an antifriction bearing preferably by measuring the distance between the stationary out race and a rolling body of suitable design. FIG. 2 shows a suitable embodiment of this type in conjunction with a cylindrical roller bearing. In this case, the roller 44 is provided at one end thereof with a cylindrical projection 45 of smaller diameter than the roller. The roller cage 46 of the bearing is of the comb type. The feeler means 47 is mounted in the outer race 48 and co-operates with the cylindrical periphery of projection 45. The measuring means may be adapted to operate in a known manner, for example, electronically, i.e. capacitively without physical contact, or pneumatically.

It is preferred to provide a plurality of pairs of measuring nozzles which are spaced circumferentially. According to another feature of the invention, there may be provided in the measuring circuit suitable signal generators operating in a known manner; such signal generators may be adapted, for example, upon some undesirable condition having developed, such as an excessively high preload, either to stop the machine of which the bearing forms a part or to initiate measures adapted to return the bearing to its normal condition of operation. It would thus be possible, for example, to cause cooling air to be blown through the affected bearing. It will be understood that the pneumatic feeler means may be replaced by electronic, optical or electric feeler means.

While several embodiments described herein are at present considered to be preferred, it is understood that various modifications and improvements may be made therein, and it is intended to cover in the appended claims all such modifications and improvement as fall within the true spirit and scope of the invention.

What is claimed is:

1. A feeler device in an anti-friction bearing of the type having an inner race member, an outer race member, at least one roller member and a roller cage; said device comprising at least one feeler means, one end of which is fixedly mounted in one of said race members and the other end of which extends outward therefrom towards the other race member, and measuring means associated with said feeler means to measure the distance between said other end thereof and said other race member.

2. The device of claim 1 wherein there are provided two of said feeler means extending to either side of said roller member, said other end of each of which extends to the proximity of said other race member to measure the distance between said race members.

3. The device of claim 2 further comprising means responsive to said measuring means to control the load on said bearing.

4. The device of claim 1 wherein said roller member has a cylindrical projection extending outward from one of its ends between said race members and wherein said other end of said feeler means extends to the proximity of said projection to measure the distance between said first race member and said roller member.

5. The device of claim 4 further comprising means responsive to said measuring means to control the load on said bearing.

6. The device of claim 1, wherein said measuring means is adapted to operate mechanically.

7. The device of claim 1, wherein said measuring means is adapted to operate optically.

8. The device of claim 1, wherein said measuring means is adapted to operate electrically.

9. The device of claim 1, wherein said measuring means is adapted to operate electronically.

10. The device of claim 1, wherein said measuring means is adapted to operate pneumatically.

References Cited

UNITED STATES PATENTS

| 2,683,983 | 7/1954 | Aller | 308—173 |
| 2,687,038 | 8/1954 | Aller | 308—173 |

FOREIGN PATENTS

| 50,044 | 8/1919 | Sweden. |

MARTIN P. SCHWADRON, *Primary Examiner.*

FRANK SUSKO, *Examiner.*